(12) United States Patent
Ho et al.

(10) Patent No.: US 9,116,580 B2
(45) Date of Patent: Aug. 25, 2015

(54) CAPACITIVE TOUCH PANEL, MANUFACTURING METHOD AND SCANNING METHOD

(75) Inventors: Kwan-Sin Ho, Miaoli (TW); Yong Liu, Singapore (SG); Pingping Huang, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 816 days.

(21) Appl. No.: 13/044,565

(22) Filed: Mar. 10, 2011

(65) Prior Publication Data

US 2011/0273398 A1    Nov. 10, 2011

(30) Foreign Application Priority Data

May 4, 2010    (CN) .......................... 2010 1 0170073

(51) Int. Cl.
  *G06F 3/045*    (2006.01)
  *G06F 3/044*    (2006.01)

(52) U.S. Cl.
  CPC ...... *G06F 3/044* (2013.01); *G06F 2203/04103* (2013.01); *Y10T 29/43* (2015.01)

(58) Field of Classification Search
  CPC .................... G06F 3/044; G06F 2203/04103
  USPC ................... 345/173–174; 178/18.06
  See application file for complete search history.

(56) References Cited

U.S. PATENT DOCUMENTS

| | | | | |
|---|---|---|---|---|
| 4,859,813 A * | 8/1989 | Rockwell | ................... | 178/18.03 |
| 5,854,448 A * | 12/1998 | Nozaki et al. | ............. | 178/18.01 |
| 6,075,520 A * | 6/2000 | Inoue et al. | ................... | 345/173 |
| 7,876,311 B2 * | 1/2011 | Krah et al. | ..................... | 345/173 |
| 8,040,326 B2 * | 10/2011 | Hotelling et al. | ............ | 345/173 |
| 8,432,364 B2 * | 4/2013 | Krah | ............................. | 345/173 |
| 8,493,331 B2 * | 7/2013 | Krah et al. | ..................... | 345/173 |
| 8,605,051 B2 * | 12/2013 | Hotelling et al. | ............ | 345/173 |
| 2006/0238518 A1 * | 10/2006 | Westerman et al. | ......... | 345/173 |
| 2007/0063876 A1 | 3/2007 | Wong | | |
| 2008/0309625 A1 * | 12/2008 | Krah et al. | ..................... | 345/173 |
| 2008/0309627 A1 * | 12/2008 | Hotelling et al. | ............ | 345/173 |
| 2008/0309628 A1 * | 12/2008 | Krah et al. | ..................... | 345/173 |
| 2009/0009483 A1 * | 1/2009 | Hotelling et al. | ............ | 345/173 |
| 2009/0033641 A1 * | 2/2009 | Yamazaki | ..................... | 345/204 |
| 2009/0189867 A1 * | 7/2009 | Krah et al. | ..................... | 345/173 |
| 2009/0212642 A1 * | 8/2009 | Krah | ............................. | 307/109 |
| 2009/0273577 A1 * | 11/2009 | Chen et al. | ..................... | 345/174 |
| 2009/0315835 A1 * | 12/2009 | De Goes et al. | ............. | 345/173 |
| 2009/0315840 A1 * | 12/2009 | Park et al. | ..................... | 345/173 |
| 2010/0289769 A1 * | 11/2010 | Watanabe | ..................... | 345/174 |
| 2011/0063232 A1 * | 3/2011 | Li et al. | ......................... | 345/173 |
| 2011/0073384 A1 * | 3/2011 | Osoinach et al. | ......... | 178/18.06 |
| 2011/0074731 A1 * | 3/2011 | Inoue et al. | ..................... | 345/174 |
| 2011/0096019 A1 * | 4/2011 | Tsai et al. | ..................... | 345/174 |
| 2011/0261006 A1 * | 10/2011 | Joharapurkar et al. | ....... | 345/174 |
| 2011/0279410 A1 * | 11/2011 | Han et al. | ..................... | 345/174 |

* cited by examiner

*Primary Examiner* — Kumar Patel
*Assistant Examiner* — Vinh Lam
(74) *Attorney, Agent, or Firm* — Gokalp Bayramoglu (57) ABSTRACT

The present invention discloses a capacitive touch panel, comprises a touch sensing pattern form on a substrate, which could generate a sensing signals in response to a touch on the capacitive touch panel; a plurality of first signal lines and a second signal line for conducting the sensing signals; the touch sensing pattern comprises a plurality of first conductive assemblies arranged in a first direction, a first end of each first conductive assembly respectively connects to a corresponding first signal line; the second signal line connects the second ends of all of the first conductive assemblies together.

18 Claims, 10 Drawing Sheets

Prior Art

FIG. 1

Prior Art

FIG. 2

Prior Art

CAPACITIVE TOUCH PANEL, MANUFACTURING METHOD AND SCANNING METHOD

This application claims the benefit of application of People's Republic of China No. 201010170073.7, filed on May 4, 2010.

FIELD OF THE INVENTION

The present invention generally relates to touch panels, and more particularly to a capacitive touch panel having a quite high scanning frequency, a manufacturing method of making the touch panel and a method for scanning the touch panel.

BACKGROUND OF THE INVENTION

In recent years, the touch panel is more and more popular, and may replace the mouse and the keyboard in the future. Touch panels have been widely used in home appliances, communication devices, and electronic information products such as a personal digital assistant (PDA), and a game input interface. Now, a touch panel is always integrated with a display panel, so a user can touch a position on the touch panel corresponding to a displayed image of the display panel to select an operation directly. Therefore, such a combined structure of the touch panel and the display panel provides users with better portability and more comfortable input operation.

There are many types of touch panels, such as resistance touch panel, capacitive touch panel, infrared sensing touch panel, electromagnetic sensing touch panel, and acoustic wave sensing touch panel, according to different technology principles. Herein, the capacitive touch panel is a comparatively good type because of its high sensitivity, low cost, and simple structure. Theoretically, the capacitive touch panel detects the capacitance changes of the electrodes generated by a human body or other grounded material to determine the touch position.

Figure 1:
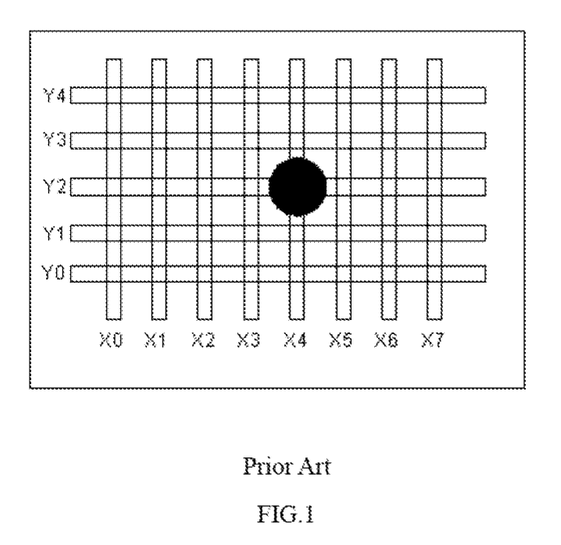
FIG. 1 is a schematic view showing the detecting principle of a related capacitive touch panel.

Referring to FIG. 1, the conventional capacitive touch panel includes a circuit pattern, made of conductive materials, formed on a substrate. The circuit pattern has x-axis (X0-X7) and Y-axis (Y0-Y4) electrode strips. In operation, a control circuit scans the electrode strips sequentially. When a finger or other grounded conductors touch a position (shown as black area) of the capacitive touch panel, the capacitance of the X-axis electrode strips and Y-axis electrode strips which be touched change, and after sensing the capacitance of the electrode strips, the control circuit will determine the X-axis and Y-axis coordinates of the touched position based on the capacitance changes. In some applications, a plurality of diamond shaped conductive cells arranged along the X-axis and Y-axis directions are used to replace the conductive strips shown in FIG. 1.

Figure 2:
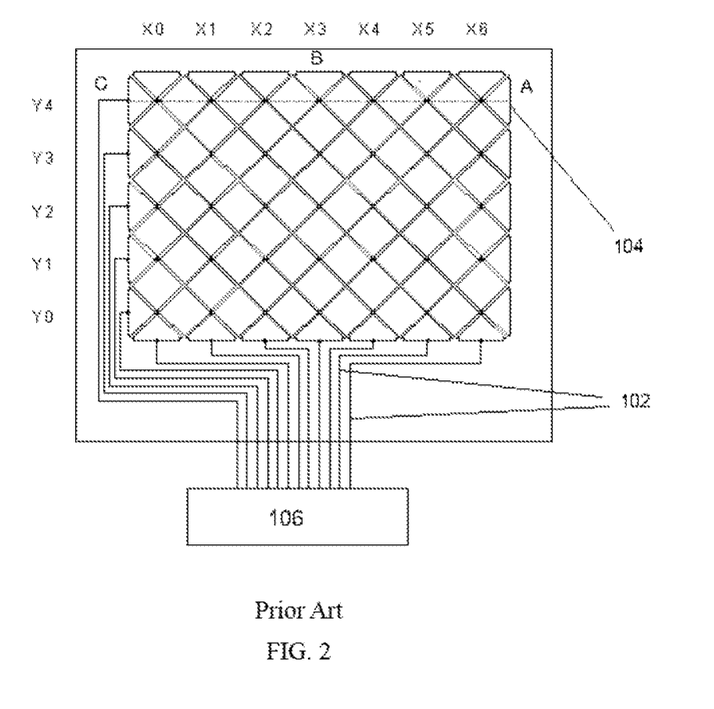
FIG. 2 is a schematic view of the structure of another related capacitive touch panel.

FIG. 2 shows the structure of the conventional capacitive touch panel with single sided routing. A plurality of conductive traces 102 connects one ends of the X-axis (X0-X6) and Y-axis (Y0-Y4) conductive cells 104 of the conductive touch panel to a controller 106 for transferring electrical signals to the controller 106 to analyze.

One aspect of electronic performance of a touch panel is that the total impedance of the conductive strips and conductive traces should be considered. Generally a high impedance will lead to a rapid attenuation of electrical signals, thus the sensitivity of the touch panel will be reduced. When a plurality of diamond shaped conductive cells replace the conductive strips, the connection between the adjacent transparent conductive cells will have high impedance.

Figure 3:
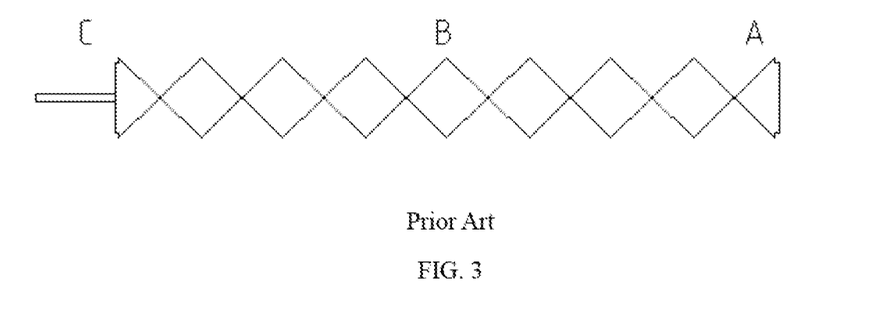
FIG. 3 is a schematic view of a single row of the capacitive touch panel shown in FIG. 2.

Further referring to FIG. 3, a single row of diamond shaped conductive cells shown in FIG. 2 is illustrated with indicated symbols C, B, A. The single row is connected to the controller (not shown) via the end C. In operation, the electrical signals are transmitted from the end C to the midpoint B, and then to the other end A. Along the direction of the transmission of the electrical signals (C-B-A), the impedance of the single axis gradually increases and the signal to noise ratio will get smaller, especially at higher frequencies. In that case, for the same touched area, the signal to noise ratio at the point close to end C is bigger than the signal to noise ratio at the point close to end A. Furthermore, if the impedance increases to a certain level, signal to noise ratio may be low such that it is no longer possible to process the signal. Usually, scanning frequency can be reduced to keep the signal to noise ratio similar at the end C and end A of the row. However, if the scanning frequency is reduced, other problems will occur, such as low scanning speed and low detecting sensitivity.

Therefore, a new touch panel having not only a comparatively high scanning speed but also a comparatively low impedance is needed to overcome said problems.

SUMMARY OF THE INVENTION

The present invention seeks to provide a capacitive touch panel, which provide low impedance so as to increase the reliability of the touch panel and can be easily made.

Another object of the present invention is to provide a capacitive touch panel that could avoid signal attenuation so as to increase signal to noise ratio therefore increasing the sensitivity of the touch panel.

Further object of the present invention is to provide a manufacture method for reducing the impedance of a touch panel and reducing signal attenuation in response to a touch on a touch panel.

Further object of the present invention is to provide a scanning method for reducing the time of charging and discharging so as to reduce the electric consumption therefore avoiding signal attenuation in response to a touch on a touch panel.

In general, the present invention discloses a capacitive touch panel comprises a touch sensing pattern formed on a substrate to generate a sensing signals in response to a touch on the capacitive touch panel, the touch sensing pattern comprises a plurality of first conductive assemblies arranged in a first direction; a plurality of first signal lines and a second signal line for conducting the sensing signals, wherein each first signal line connects to the first end of each first conductive assembly respectively; and the second signal line connects the second ends of all the first conductive assemblies together.

Preferably the touch sensing pattern further comprises a plurality of second conductive assemblies—arranged in a second direction, the first end of each second conductive assembly respectively connects to a corresponding first signal line.

Preferably, the capacitive touch panel comprises a third signal line, which connects the second end of all the second conductive assemblies together.

Preferably, the first conductive assemblies and the second conductive assemblies are made of transparent conductive material.

Preferably, the first signal lines, the second signal line and the third signal line are made of metal or transparent conductive material.

The present invention also discloses a manufacture method of making the capacitive touch panel, comprises following steps: forming a plurality of first conductive assemblies arranged in a first direction; forming a plurality of first signal lines, and each first signal line connects to the first end of corresponding first conductive assembly respectively; and forming a second signal line connecting the second end of all the first conductive assemblies together.

Preferably, the manufacturing method further comprises following steps: forming a plurality of second conductive assemblies arranged in a second direction; and the first end of each second conductive assembly is respectively connected to a corresponding first signal line.

Preferably, the manufacturing method further comprises a step of forming a third signal line connecting the second ends of all the second conductive assemblies together.

Preferably, each above mentioned step is performed by a working procedure comprising sputtering, exposing, developing and etching in turn.

The present invention also discloses a scanning method of the capacitive touch panel, comprises scanning each first conductive assemblies through a first signal line connected to the first end of each first conductive assembly, meanwhile providing a constant signal source with a common driving signal through a second signal line to the second ends of all the first conductive assemblies; when scanning one of the first conductive assembly, scanning signal is input to the first end of the scanned first conductive assembly to charge and then discharge repeatedly, and the second end of the scanned first conductive assembly is connected to the constant signal source through the second signal line while the first ends and the second ends of other non-scanned first conductive assemblies are connected to the constant signal source through the corresponding first signal lines and the second signal line.

The present invention also discloses a scanning method of the capacitive touch panel, comprises scanning each first conductive assembly and each second conductive assembly through a corresponding first signal line connected to the first end of each first conductive assembly and the first end of each second conductive assembly, meanwhile providing a constant signal source with common driving signals through a second signal line to the second ends of all the first conductive assemblies; when scanning one of the first conductive assembly, scanning signal is input to the first end of the scanned first conductive assembly to charge and then discharge repeatedly, and the second end of the scanned first conductive assembly is connected to the constant signal source through the second signal line while the second conductive assemblies are grounded and the first ends and the second ends of other non-scanned first conductive assemblies are connected to the constant signal source through the corresponding first signal lines and the second signal line.

The present invention also discloses a scanning method of the capacitive touch panel, comprises scanning each first conductive assemblies through a first signal line connected to the first end of each first conductive assembly, meanwhile providing a constant signal source with a common driving signal through a second signal line to the second ends of all the first conductive assemblies; scanning each second conductive assemblies through a first signal line connected to the first end of each second conductive assembly, meanwhile providing a constant signal source with a common driving signal through a third signal line to the second ends of all the first conductive assemblies; when scanning one of the first conductive assembly, scanning signal is input to the first end of the scanned first conductive assembly to charge and then discharge repeatedly through a corresponding first signal line, and the second end of the scanned first conductive assembly is connected to the constant signal source through the second signal line while the second conductive assemblies are grounded and the first ends and the second ends of other non-scanned first conductive assemblies are connected to the constant signal source; when scanning one of the second conductive assembly, scanning signal is input to the first end of the scanned second conductive assembly though a corresponding first signal line and the second end of the scanned second conductive assembly connecting to the constant signal source through a third signal line while the first conductive assemblies are grounded and the first ends and the second ends of other non-scanned second conductive assemblies are connected to the constant signal source.

Preferably, the constant signal source provides common driving signals with same frequency, same potential and phase for the second signal line and the third signal line.

The above summary is not intend to describe each embodiment or every implementation of the present disclosure. Advantages and attainments, together with a more complete understanding of the invention, will become apparent and appreciated by referring to the following detailed description and claims taken in conjunction with the accompanying drawing.

BRIEF DESCRIPTION OF THE DRAWINGS

For a better understanding of the invention as well as other objects and further features, references are made to the following detailed description to be read in conjunction with the accompanying drawings, as follows.

DETAILED DESCRIPTION OF THE DRAWINGS

Referring now more specifically to the Figures, in which identical or similar parts are designated by the same reference numerals throughout.

Figure 4:
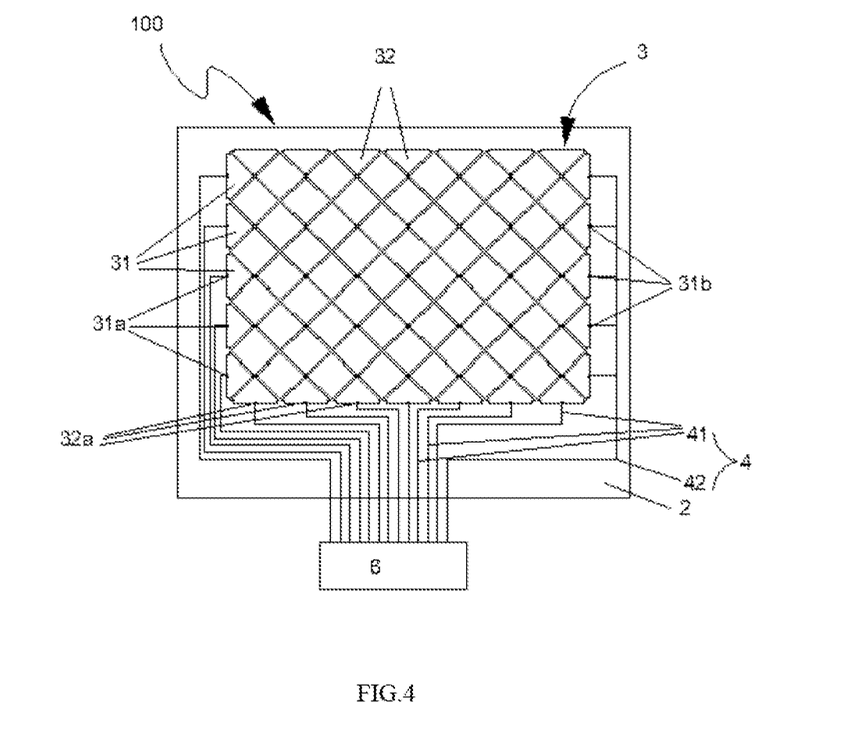
FIG. 4 is a schematic view of a capacitive touch panel in accordance with a first embodiment, wherein the capacitive touch panel includes a touch sensing pattern.

Referring to FIG. 4, a capacitive touch panel 100 in accordance with the first embodiment includes a substrate 2, a touch sensing pattern 3, a signal line group 4, and a controller 6. The touch sensing pattern 3 is formed on the substrate 2 for generating actuated sensing signals in response to a touch action on the capacitive touch panel 100. The controller 6 is configured for receiving and processing the sensing signals from the touch sensing pattern 3 via the signal line group 4. After being processed, the sensing signals may be sent to successive devices, such as a display module.

The touch sensing pattern 3 includes a plurality of first conductive assembles 31 parallelly arranged in a first direction (such as horizontal direction), and a plurality of second conductive assemblies 32 parallelly arranged in a second direction (such as longitudinal direction). The first conductive assemblies 31 and the second conductive assemblies 32 can be formed on the same layer or two separate layers respectively. The first conductive assemblies 31 and the second conductive assemblies 32 are arranged perpendicular to each other, forming a matrix structure. The signal line group 4 includes a plurality of first signal lines 41 and a second signal line 42. The first end 31a of each first conductive assembly 31 is respectively connected to the controller 6 through a corresponding first signal line 41, and the first end 32a of each second conductive assembly 32 is also connected to the controller 6 through a corresponding first signal line 41. The second signal line 42 connects the second end 31b of all of the first conductive assemblies 31 to the controller 6.

Compared with the conventional capacitive touch panel with single sided routing, the second signal line 42 is added to connect the controller 6 with the capacitive touch panel 100, which can efficiently reduce the frequency of the charging and discharging, reduce the electric consummation, avoid the serious attenuation of the signals. Therefore, the scanning speed and efficiency will be increased.

Figure 5:
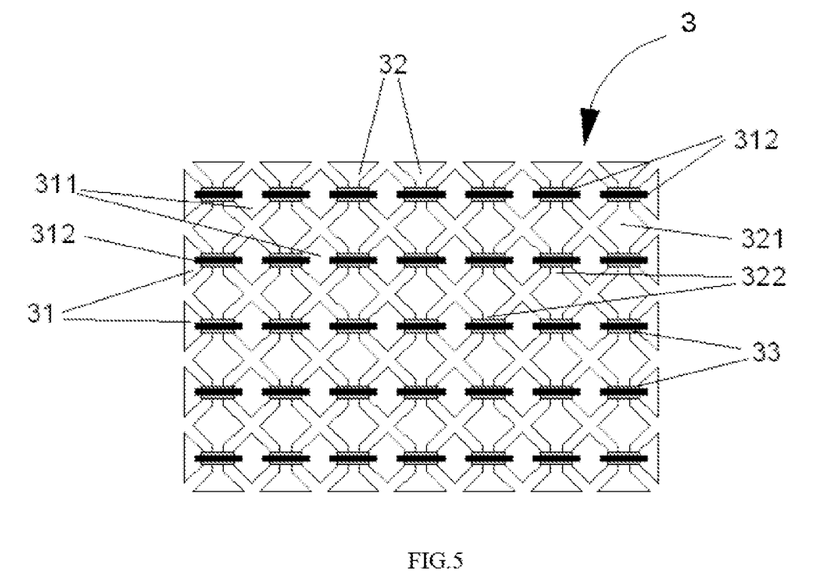
FIG. 5 is a schematic view of the touch sensing pattern of the capacitive touch panel shown in FIG. 4.

Now referring to FIG. 5, a more detailed structure of the touch sensing pattern 3 is illustrated. The first conductive assemblies 31 and the second assemblies 32 are disposed on the same layer. Each first conductive assembly 31 includes a plurality of first conductive cells 311 arranged in an equal-spaced manner along the first direction. Each second conductive assembly 32 includes a plurality of second conductive cells 321 arranged in an equal-spaced manner along the second direction. The adjacent first conductive cells 311 are interconnected by a first conductive line 312 and the adjacent second conductive cells 321 are interconnected by a second conductive line 322. The touch sensing pattern 3 further includes a plurality of insulators 33 disposed between the first conductive lines 312 and the second conductive lines 322, which are used to insulate the first conductive lines 312 from the second conductive lines 322.

The first conductive cells 311 and the second conductive cells 321 are shaped as diamond contour. It is noticed that other polygon contour, such as hexagon, octagon, rectangle, square, triangle etc., can also be used as the shape of the first and second conductive cells 311, 321. The first conductive cells 311 and the second conductive cells 321 are made of transparent conductive material, such as Indium Tim Oxide (ITO), Antimony Tin Oxide (ATO) or Titanium Oxide ($TiO_2$). The insulator 33 is made of transparent insulative material such as epoxy resin, polyimide, polyvinyl chloride and methyl methacrylate, or opaque insulative material such as ink.

Figure 6:
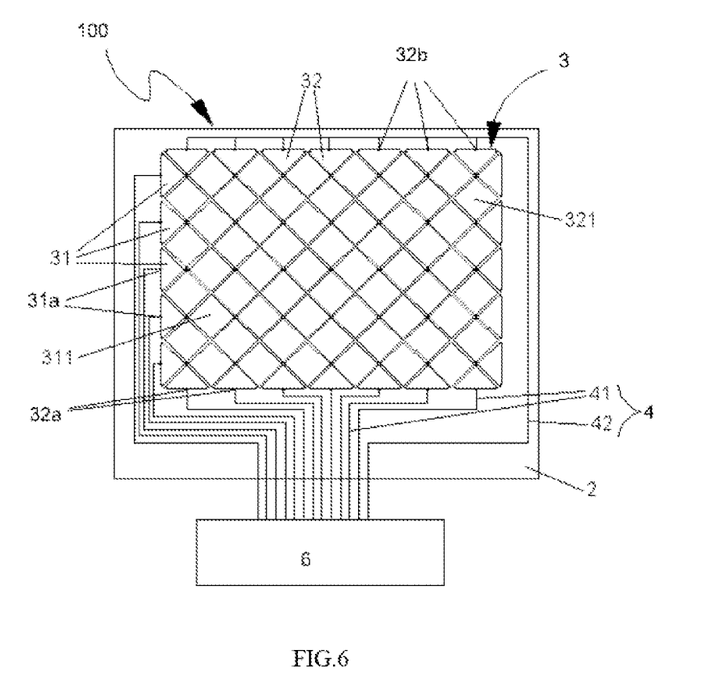
FIG. 6 is a schematic view of a capacitive touch panel in accordance with a second embodiment.

Referring to FIG. 6, a capacitive touch panel 100 in accordance with the second embodiment includes a substrate 2, a touch sensing pattern 3, a signal line group 4, and a controller 6. The touch sensing pattern 3 is formed on the substrate 2 for generating actuated sensing signals in response to a touch action on the capacitive touch panel 100. The controller 6 is configured for receiving and processing the sensing signals from the touch sensing pattern 3 via the signal line group 4. After being processed, the sensing signals may be sent to successive devices, such as a display module.

The touch sensing pattern 3 includes a plurality of first conductive assembles 31 parallelly arranged in a first direction (such as horizontal direction), and a plurality of second conductive assemblies 32 parallelly arranged in a second direction (such as longitudinal direction). The first conductive assemblies 31 and the second conductive assemblies 32 can be formed on the same layer or two separate layers respectively. The first conductive assemblies 31 and the second conductive assemblies 32 are arranged perpendicular to each other, forming a matrix structure. The signal line group 4 includes a plurality of first signal lines 41 and a second signal line 42. The first end 31a of each first conductive assembly 31 is respectively connected to the controller 6 through a corresponding first signal line 41, and the first end 32a of each second conductive assembly 32 is also connected to the controller 6 through a corresponding first signal line 41. The second signal line 42 connects the second end 32b of all of the second conductive assemblies 32 to the controller 6.

In the first embodiment, the second signal line 42 connects the second end 31b of all of the first conductive assemblies 31 to the controller 6. Compared with the first embodiment, the second embodiment uses the second signal line 42 to connect the second end 32b of all of the second conductive assemblies 32 to the controller 6.

Figure 7:
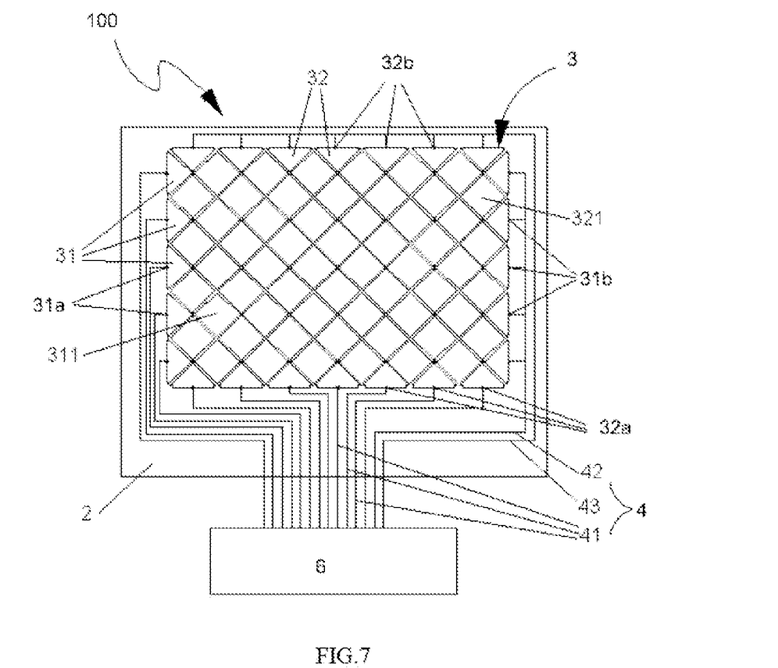
FIG. 7 is a schematic view of a capacitive touch panel in accordance with a third embodiment.

Referring to FIG. 7, a schematic view of a capacitive touch panel in accordance with the third embodiment of the invention is shown. The capacitive touch panel 100 in accordance with the third embodiment includes a substrate 2, a touch sensing pattern 3, a signal line group 4, and a controller 6. The touch sensing pattern 3 is formed on the substrate 2 for generating actuated sensing signals in response to a touch action on the capacitive touch panel 100. The controller 6 is configured for receiving and processing the sensing signals from the touch sensing pattern 3 via the signal line group 4. After being processed, the sensing signals may be sent to successive devices, such as a display module.

The touch sensing pattern 3 includes a plurality of first conductive assembles 31 parallelly arranged in a first direction (such as horizontal direction), and a plurality of second conductive assemblies 32 parallelly arranged in a second direction (such as longitudinal direction). The first conductive assemblies 31 and the second conductive assemblies 32 can be formed on the same layer or two separate layers respectively. The first conductive assemblies 31 and the second conductive assemblies 32 are arranged to form a matrix structure. The signal line group 4 includes a plurality of first signal lines 41 and a second signal line 42. The first end 31a of each first conductive assembly 31 is respectively connected to the controller 6 through a corresponding first signal line 41, and the first end 32a of each second conductive assembly 32 is also connected to the controller 6 through a corresponding first signal line 41. The second signal line 42 connects the second end 31b of all the first conductive assemblies 31 to the controller 6 and the third signal line 43 connects the second end 32b of all the second conductive assemblies 32 to the controller 6.

In the first embodiment, the second signal line 42 connects the second end 31b of all of the first conductive assemblies 31 to the controller 6. Compared with the first embodiment, the third embodiment uses an additional signal line 43 to connect the second end 32b of all of the second conductive assemblies 32 to the controller 6. That is, there are two common signal lines in the third embodiment, the second signal line 42 and the third signal line 43.

In above embodiments, the substrate 2 is made of transparent conductive material, such as glass. The touch sensing pattern 3 can be made by the pattern processes on the substrate 2. The first conductive assemblies 31 and the second conductive assemblies 32 can arranged in an equal-spaced manner or in a non-equidistance manner. The first conductive assemblies 31 and the second conductive assemblies 32 are arranged perpendicular to each other, or a in a non-orthogonal manner. The first conductive assemblies 31 and the second conductive assemblies 32 can be made of transparent conductive material, such as Indium Tim Oxide (ITO), Antimony Tin Oxide (ATO) or Titanium Oxide (TiO2) through the working procedure comprising of sputtering, exposing, developing and etching. The first signal line 41, the second signal line 42 and the third signal line 43 are made of transparent conductive material, such as Indium Tim Oxide (ITO), Antimony Tin Oxide (ATO) or Titanium Oxide (TiO2), or made of metal, such as silver, copper, etc.

Figure 8A:
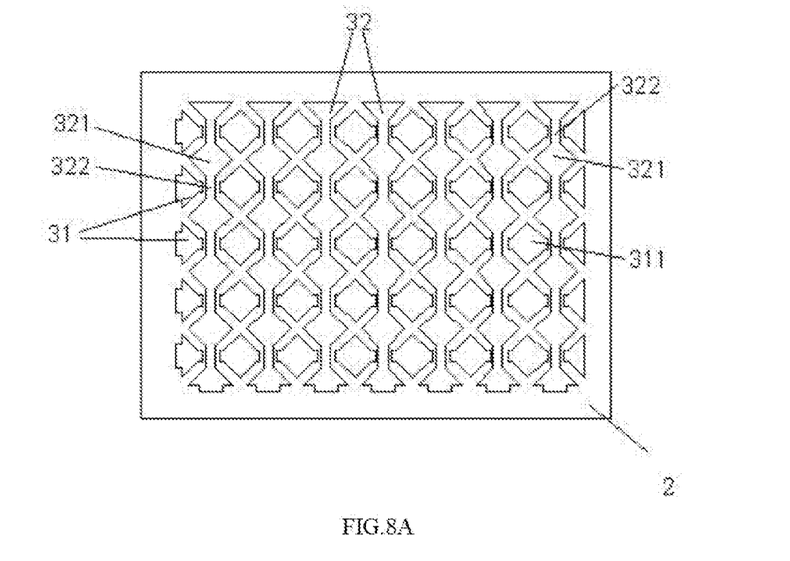
FIGS. 8A-8C are schematic views of pattern structures in deferent manufacturing statuses during a first manufacturing method making the capacitive touch panel according to the first embodiment.
Figure 8B:
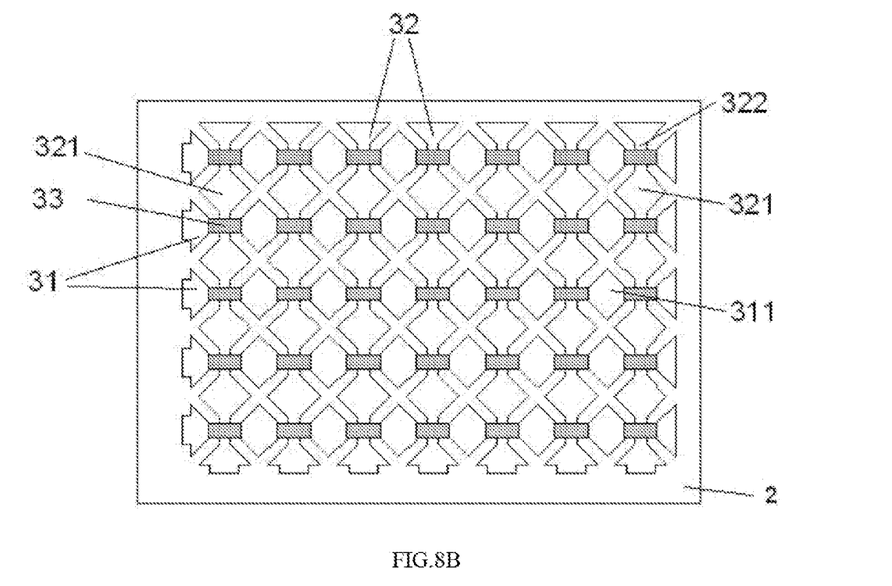
Figure 8C:
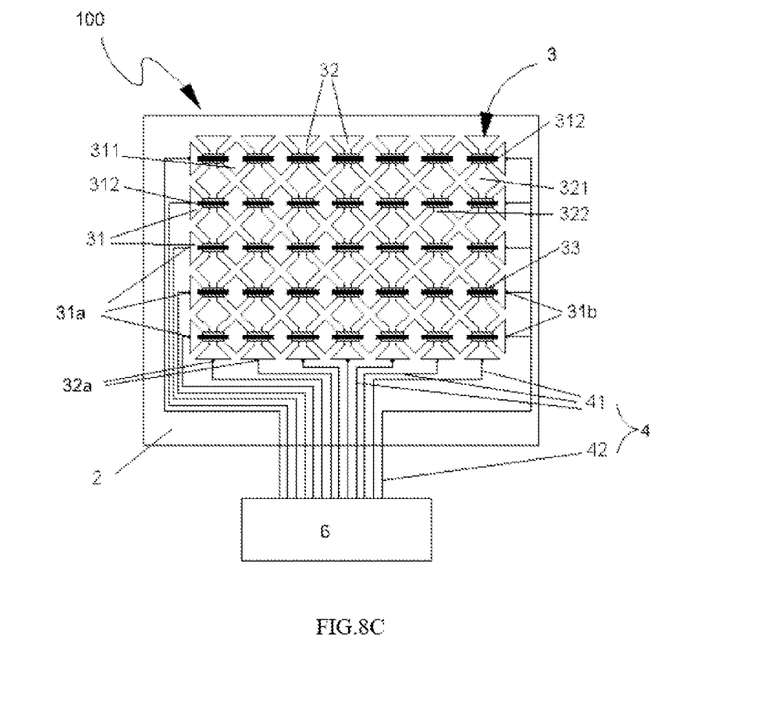
Figure 9:
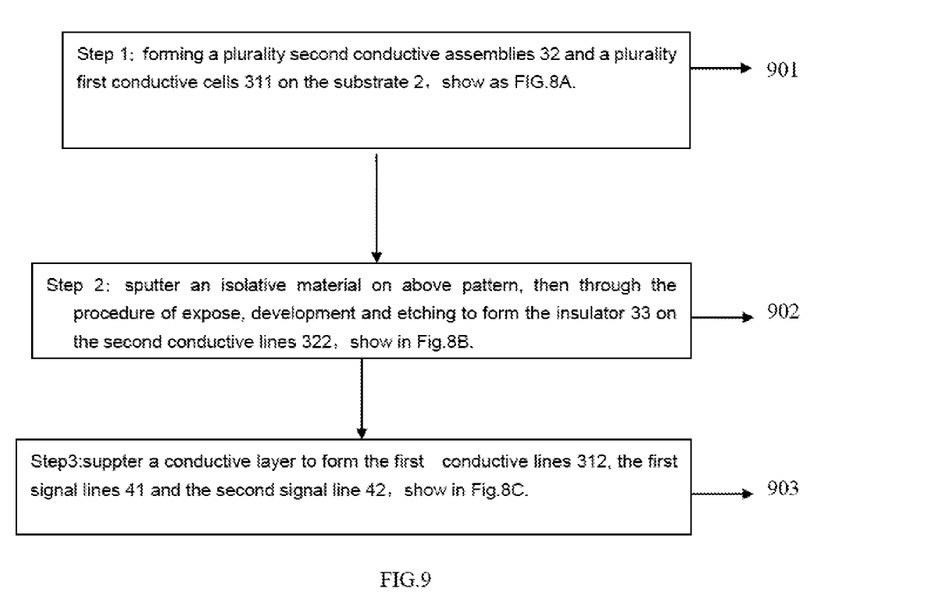
FIG. 9 is a flow chart showing the first manufacturing method.

In this section, a manufacturing method of making a capacitive touch panel will be depicted. FIGS. 8A-8C are schematic views of pattern structures in deferent manufacturing statuses during a first manufacturing method making the capacitive touch panel. The detailed flow chart of the manufacturing method is shown in FIG. 9. The manufacturing method includes following steps.

In step 901, a plurality of the second conductive assemblies 32 and a plurality of first conductive cells 311 are formed on a substrate 2. In detail, the step 901 further comprises: firstly, providing a cleaned substrate 2; secondly, sputtering a transparent conductive layer on the cleaned substrate 2; thirdly, covering a mask over the sputtered substrate 2, then exposing the sputtered substrate 2 under a light, after that a pattern will be developed on the sputtered substrate 2; and finally, etching the patterned substrate 2 to form a first temporary pattern on the substrate 2. After the step 901 is finished, a first temporary pattern is generated and is shown in FIG. 8A. In this status, adjacent second conductive cells 321 are interconnected by the second conductive lines 322, and the adjacent first conductive cells 311 are separated from each other.

In step 902, a plurality of insulator are formed on the first temporary pattern shown in FIG. 8A. In detail, the step 902 further comprises: firstly, sputtering an insulative layer on the first temporary pattern shown in FIG. 8A; secondly, covering a mask over the substrate 2, then exposing the sputtered first temporary pattern under a light, after that a second pattern will be developed on the sputtered first temporary pattern; and finally etching the patterned substrate 2 to form a insulator 33 on each second conductive line 322, After the step 902 is finished, a second temporary pattern is generated and is shown in FIG. 8B.

In step 903, a plurality of the first signal lines 41, the second signal line 42, and a plurality of first conductive lines 312 are formed on the second temporary pattern shown in FIG. 8B. In detail, the step 903 further comprises: firstly, sputtering a conductive layer on the second temporary pattern; secondly, covering a mask over the substrate 2, then exposing the sputtered second temporary pattern under a light, after that a third pattern will be developed on the sputtered second temporary pattern; and finally etching the patterned substrate 2 to form the first conductive lines 312, a plurality of the first signal lines 41 and the second signal line 42. After the step 903 is finished, the pattern structure of the capacitive touch panel 100 is generated and is shown in FIG. 8C. In the structure, the first end 31a of each first conductive assembly 31 respectively connect to the controller 6 through a corresponding first signal line 41, and the first end 32a of each second conductive assembly 32 respectively connect to the controller 6 also through corresponding first signal line 41; the second signal line 42 connecting the second end 31b of all of the first conductive assemblies 31 to the controller 6.

In above manufacturing method, each step is performed by the same working procedure comprising sputtering, exposing, developing and etching in, turn as described above.

Figure 10:
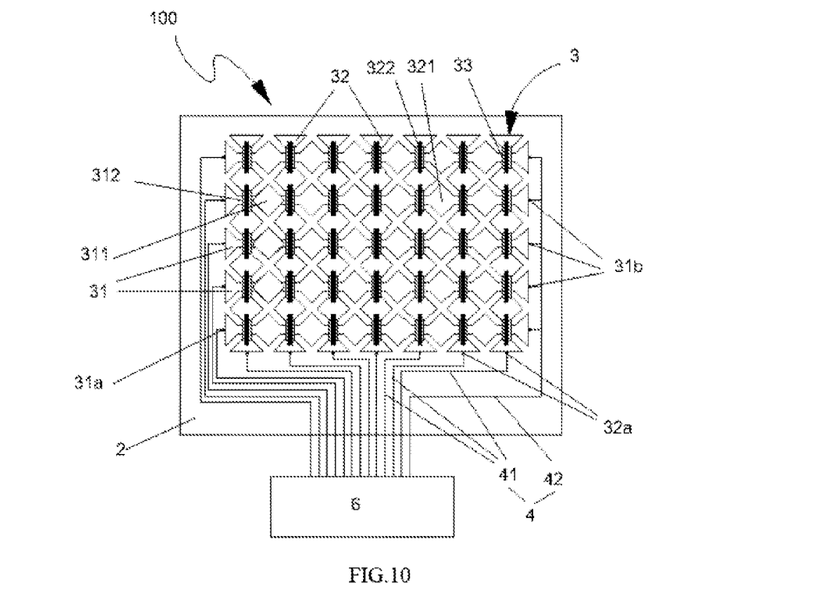
FIG. 10 is a schematic view of a capacitive touch panel in accordance with the first embodiment of the invention which, is made by a second manufacturing method.

There is a second embodiment of the manufacturing method which comprises following steps: first step, forming a plurality of the first conductive assemblies 31 and a plurality of second conductive cells 321 on the substrate 2 to form a fourth temporary pattern in which the adjacent first conductive cells 311 is interconnected by the first conductive lines 312 and no electrical connection exists between the adjacent second conductive cells 321; second step, forming an insulator 33 on each first conductive line 312 on the fourth temporary pattern to construct a fifth temporary pattern; third step, forming the second conductive lines 322 between the adjacent second conductive cells 321, and forming a plurality of the first signal lines 41 and the second signal line 42 on the fifth temporary pattern, to construct the structure shown in FIG. 10. The working procedure of each step of the second manufacturing method are the same as the working procedure of each step of the first manufacturing method embodiment, such as in each step, the working procedure comprises sputtering, exposing, developing and etching in turn.

In the above manufacturing methods, the conductive layer is made of transparent conductive material, such as Indium Tim Oxide (ITO), Antimony Tin Oxide (ATO) or Titanium Oxide (TiO$_2$), or made of metal, such as silver, copper, etc. The step of forming the a plurality of first signal lines 41 and the step of forming a plurality of the second conductive assemblies 32 and a plurality of first conductive cells 311 can be performed simultaneously, or the step of forming the a plurality of first signal lines 41, the step of forming a plurality of the first conductive assemblies 31 and a plurality of second conductive cells 321 can be performed simultaneously. The step of forming the second signal lines 4 and the step of forming a plurality of the second conductive assemblies 32 and a plurality of first conductive cells 311 are performed simultaneously, or the step of forming the a plurality of second signal lines 42 and the step of forming a plurality of the first conductive assemblies 31 and a plurality of second conductive cells 321 are performed simultaneously.

The manufacturing method of the second embodiment of the invention is very similar to the manufacturing method of the first embodiment, comprises: first step, forming a plurality of the second conductive assemblies 32 and a plurality of first conductive cells 311, after this step, the adjacent second conductive cells 321 have already interconnected by the second conductive lines 322, but there is no electrical connection exists between the adjacent first conductive cells 311; second step, forming a insulator 33 on each second conductive line 322; third step, forming the first conductive lines 312, a plurality of the first signal lines 41 and the second signal line 42, that is, the first end 31a of each first conductive assembly 31 respectively connect to the controller 6 through corresponding first signal line 41, and the first end 32a of each second conductive assembly 32 respectively connect to the controller 6 also through corresponding first signal line 41; the second signal line 42 connecting the second end 32b of all of the second conductive assemblies 32 to the controller 6. The working procedures, material are the same to the manufacturing method of the first embodiment. The manufacturing method of the second embodiment also have a second embodiment, and the working procedures of the second manufacturing method are the same to the second manufacturing method of the first embodiment, so there is no need to elaborate.

In the manufacturing method of the first embodiment, the second signal line 42 formed in the third step connects the second end 31b of all of the first conductive assemblies 31 to the controller 6. Compared with the manufacturing method of the first embodiment, in the manufacturing method of the second embodiment, the second signal line 42 formed in the third step connecting the second end 32b of all of the second conductive assemblies 32 to the controller 6, that is, the added common signal line 42 is connect to the second end 32b of the second assemblies 32.

Figure 11:
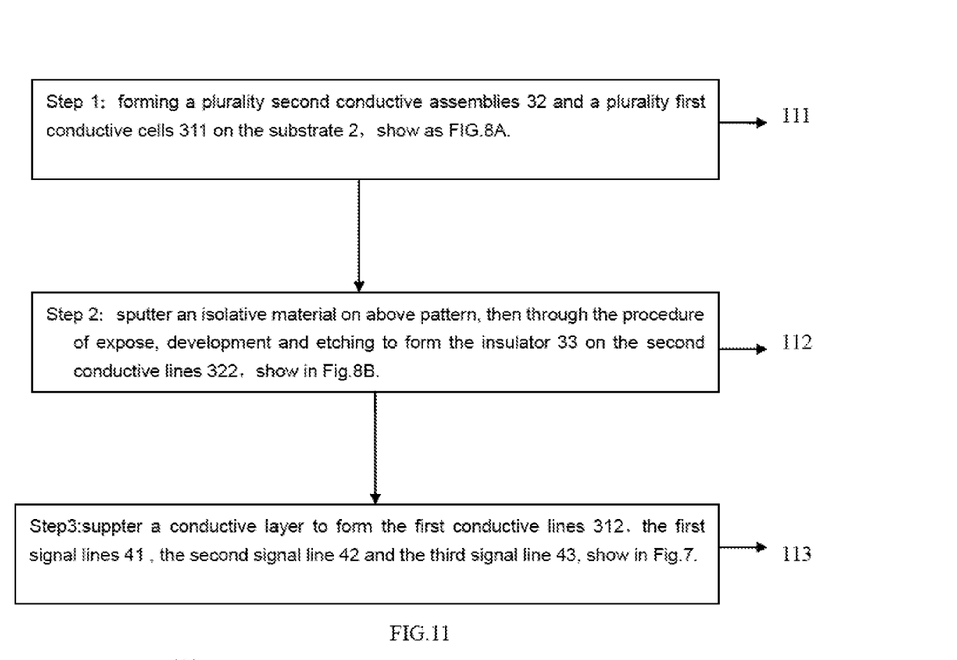
FIG. 11 is a flow chart showing a second manufacturing method making a capacitive touch panel according to the third embodiment.

The manufacturing method of the third embodiment of the invention is also similar to the manufacturing method of the first embodiment, The detailed flow chart is shown in FIG. 11, the manufacturing method includes following steps.

In step 111, a plurality of the second conductive assemblies 32 and a plurality of first conductive cells 311 are formed on a substrate 2. In detail, the step 111 further comprises: firstly, providing a cleaned substrate 2; secondly, sputtering a transparent conductive layer on the cleaned substrate 2; thirdly, covering a mask over the sputtered substrate 2, then exposing the sputtered substrate 2 under a light, after that a pattern will be developed on the sputtered substrate 2; and finally, etching the patterned substrate 2 to form a first temporary pattern on the substrate 2. After the step 901 is finished, a first temporary pattern is generated and is shown in FIG. 8A. In this status, adjacent second conductive cells 321 are interconnected by the second conductive lines 322, and the adjacent first conductive cells 311 are separated from each other.

In step 112, a plurality of insulator are formed on the first temporary pattern shown in FIG. 8A. In detail, the step 112 further comprises: firstly, sputtering an insulative layer on the first temporary pattern shown in FIG. 8A; secondly, covering a mask over the substrate 2, then exposing the sputtered first temporary pattern under a light, after that a second pattern will be developed on the sputtered first temporary pattern; and finally etching the patterned substrate 2 to form a insulator 33 on each second conductive line 322, After the step 902 is finished, a second temporary pattern is generated and is shown in FIG. 8B.

In step 113, a plurality of the first signal lines 41, the second signal line 42, the third signal line 43 and a plurality of first conductive lines 312 are formed on the second temporary pattern shown in FIG. 8B. In detail, the step 113 further comprises: firstly, sputtering a conductive layer on the second temporary pattern; secondly, covering a mask over the substrate 2, then exposing the sputtered second temporary pattern under a light, after that a pattern will be developed on the sputtered second temporary pattern; and finally etching the patterned substrate 2 to form the first conductive lines 312, a plurality of the first signal lines 41, the second signal line 42 and the third signal line 43. After the step 113 is finished, the pattern structure of the capacitive touch panel 100 is generated and is shown in FIG. 7. In the structure, the first end 31a of each first conductive assembly 31 respectively connect to the controller 6 through a corresponding first signal line 41, and the first end 32a of each second conductive assembly 32 respectively connect to the controller 6 also through corresponding first signal line 41; the second signal line 42 connecting the second end 31b of all the first conductive assemblies 31 to the controller 6; and the third signal line 43 connecting the second end 32b of all of the second conductive assemblies 32 to the controller 6.

Figure 12:
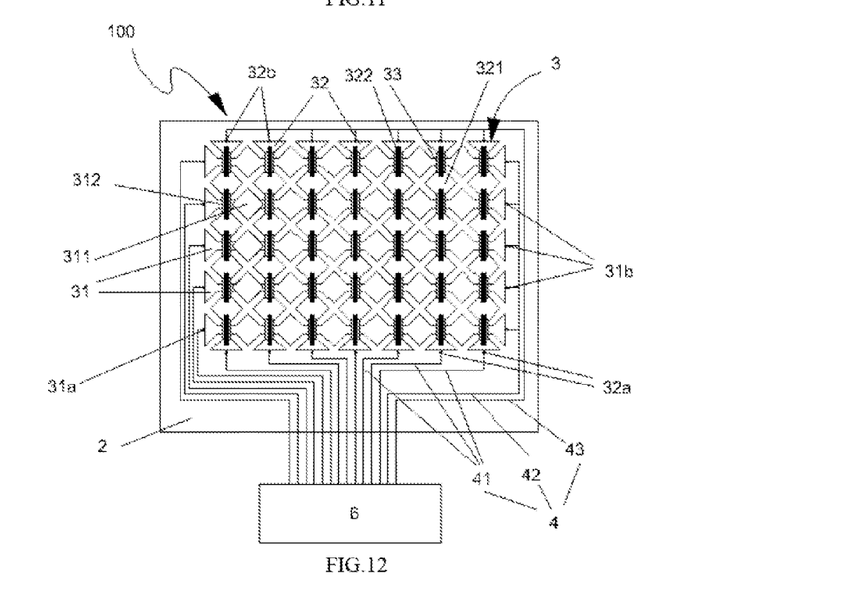
FIG. 12 is a schematic view of a capacitive touch panel in accordance with the third embodiment of the invention which is made by a second manufacturing method.

There is a second embodiment of the manufacturing method of the third embodiment which comprises following steps: first step, forming a plurality of the first conductive assemblies 31 and a plurality of second conductive cells 321 on the substrate 2 to form a sixth temporary pattern in which the adjacent first conductive cells 311 is interconnected by the first conductive lines 312 and no electrical connection exists between the adjacent second conductive cells 321; second step, forming an insulator 33 on each first conductive line 312 on the sixth temporary pattern to construct a seventh temporary pattern; third step, forming the second conductive lines 322, a plurality of the first signal lines 41, the second signal line 42 and the third signal line 43 on the seventh temporary pattern, to construct the structure shown in FIG. 12. The working procedures of each step of the second manufacturing method are the same as the working procedures of each step of the first manufacturing method, such as in each step, the working procedures comprises sputtering, exposing, developing, and etching in turn.

In the manufacturing method of the third embodiment, the conductive layer of the third step is made of trans parent conductive material, such as Indium Tim Oxide (ITO), Antimony Tin Oxide (ATO) or Titanium Oxide (TiO2), or made of metal, such as silver, copper, etc. The step of forming the a plurality of first signal lines 41 and the step of forming a plurality of the second conductive assemblies 32 and a plurality of first conductive cells 311 are performed simultaneously, or the step of forming the a plurality of first signal lines 41 and the step of forming a plurality of the first conductive assemblies 31 and a plurality of second conductive cells 321 are performed simultaneously. The step of forming the second signal lines 42 and the step of forming a plurality of the second conductive assemblies 32 and a plurality of first conductive cells 311 are performed simultaneously, or the step of forming the a plurality of second signal lines 42 and the step of forming a plurality of the first conductive assemblies 31 and a plurality of second conductive cells 321 are performed simultaneously. The step of forming the third signal lines 43 and the step of forming a plurality of the second conductive assemblies 32 and a plurality of first conductive cells 311 are performed simultaneously, or the step of forming the a plurality of third signal lines 43 and the step of forming a plurality of the first conductive assemblies 31 and a plurality of second conductive cells 321 are performed simultaneously.

In above manufacturing methods, the first conductive cells 311 and the second conductive cells 321 are shaped as diamond contour. It is noticed that other polygon contour, such as hexagon, octagon, rectangle, square, triangle etc., can also be used as the shape of the first and second conductive cells 311, 321. The first conductive cells 311 and the second conductive cells 321 are made of transparent conductive material, such as such as Indium Tim Oxide (ITO), Antimony Tin Oxide (ATO) or Titanium Oxide (TiO$_2$). The insulator 33 is made of transparent insulative material such as epoxy resin, polyimide, polyvinyl chloride and methyl methacrylate, or opaque insulative material such as ink. The first conductive line 312, the second conductive line 322, the first signal line 41, the second signal line 42 and the third signal line 43 are made of transparent conductive material, such as Indium Tim Oxide (ITO), Antimony Tin Oxide (ATO) or Titanium Oxide (TiO$_2$), or made of metal, such as silver, copper, etc.

Figure 13:
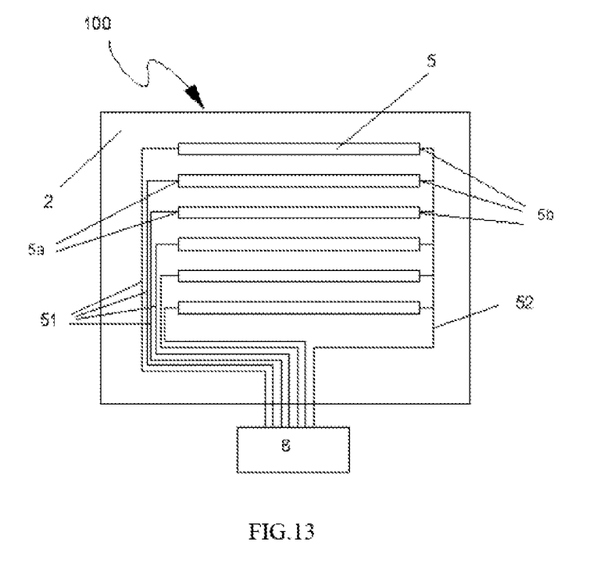
FIG. 13 is a schematic view of a capacitive touch panel in accordance with a fourth embodiment of the invention.

Now referring to FIG. 13, a schematic view of a capacitive touch panel in accordance with the fourth embodiment of the invention is shown. The capacitive touch panel 100 comprises a substrate 2, a plurality of first conductive assemblies 5 evenly-arranged in a first direction (such as horizontal axis) to formed a touch sensing pattern on the surface of the substrate 2, which generate a actuated sensing signals in response to a touch, a controller 6 configured to receive and process the sensing signals, a plurality of first signal lines 51 and a second signal line 52 to conduct the sensing signals to the controller 6. The controller 6 processing and analysis the sensing signals. After being processed, the sensing signals may be sent to successive devices, such as a display module. The first end 5a of each first conductive assembly 5 respectively connect to the controller 6 through corresponding first signal line 51, and the second signal line 52 connecting the second end 5b of all of the first conductive assemblies 5 to the controller 6. The first conductive assemblies are of a shape of rectangular stripe.

The manufacturing method of the fourth embodiment is very simple, comprises following steps: a step of preparing a substrate 2; a step of forming a plurality of first conductive assemblies 5 evenly-arranged in a first direction; a step of forming a plurality of first signal lines 51, and each first signal line 51 connect to the first end 5a of corresponding first conductive assembly 5; and a step of forming a second signal line 52 connecting to the second end 5b of all of the first conductive assemblies 5.

The step of forming a plurality of first conductive assemblies 5 evenly-arranged in a first direction; the step of forming a plurality of first signal lines 51, and each first signal line 51 connect to the first end 5a of corresponding first conductive assembly 5; and the step of forming a second signal line 52 connecting with the second end 5b of all of the first conductive assemblies 5 can be performed simultaneously. In this case, the first conductive assemblies 5, the first signal line 51, the second signal line 52 are made of transparent conductive material, such as Indium Tim Oxide (ITO), Antimony Tin Oxide (ATO) or Titanium Oxide (TiO2).

The step of forming a plurality of first conductive assemblies 5 and a step of forming a plurality of first signal lines 51 can be performed simultaneously, or the step of forming a plurality of first conductive assemblies 5 and a step of forming the second signal lines 52 can be performed simultaneously, or the step of forming a plurality of first signal lines 51 and the step of the second signal lines 52 can be performed simultaneously. In this case, the first conductive assemblies 5 are made of transparent conductive material, such as such as Indium Tim Oxide (ITO), Antimony Tin Oxide (ATO) or Titanium Oxide (TiO2), but the first signal line 51 and the second signal line 52 can be made of made of made of transparent conductive material, such as Indium Tim Oxide (ITO), Antimony Tin Oxide (ATO) or Titanium Oxide (TiO2), or metal such as silver, copper, etc.

In view of different manufacturing facilities, various application surroundings and different process requirement, the photolithography or the printing can be inducted into the manufacture process mentioned above to make the touch sensing pattern structure of the capacitive touch panel in accordance with present invention.

As shown in FIG. 2, the touch panel comprises a matrix of electrode stripes along the X-axis and Y-axis directions (X0-X6 and Y0-Y4). The scanning method of the traditional touch panel uses the controller 106 to scan the capacitance variation of each axial direction successively. When the controller 106 senses one of the axis it will charge and discharge this axial direction while others will be changed to connect to the ground. And after scanning each axial direction successively, it will start the scanning process all over again.

Figure 14:
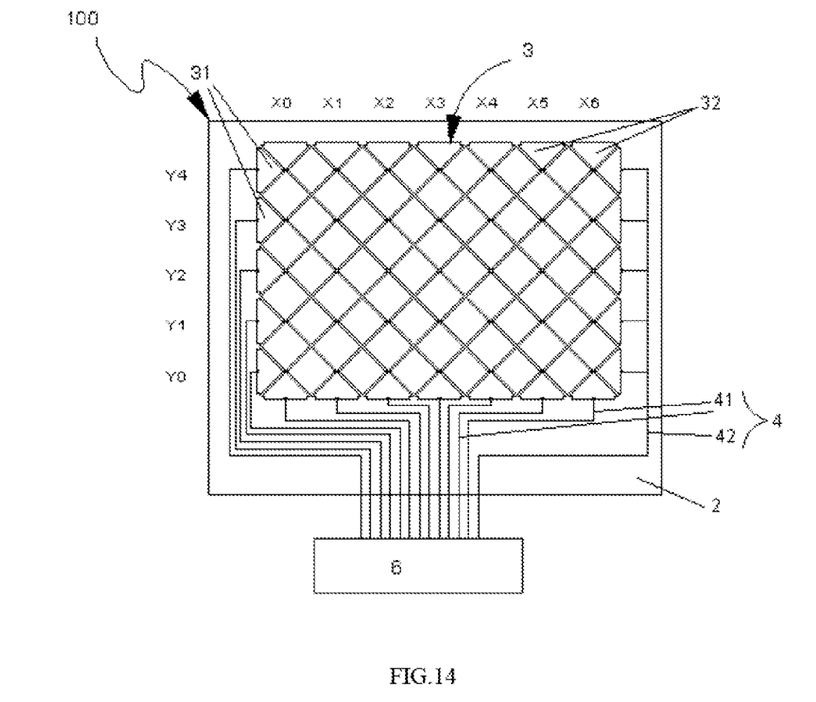
FIG. 14 is a sketch shows the work principle of the capacitive touch panel in accordance with the first embodiment of the invention.

With reference to the first embodiment, the following description illustrates the scanning method of the capacitive touch panel of the present invention. As shown in FIG. 14, the touch panel 100 comprises a matrix of conductive assemblies 31 and 32 along the X-axis and Y-axis directions. The second signal line 42 (common signal line) is always connected to a constant signal source in the controller 6 which provides common driving signals of with same frequency, same potential and phase as other signal lines successively scan the capacitance variation of each axial direction. Controller 6 scans X-axis and Y-axis one by one. When the controller 6 senses the Y0-axis, X-axis (X0-X6) will be switched to the ground while the left ends of Y1-axis to Y4-axis will be switched to connect with the common signal line 42 to receive signals provided by the same signal source. The left end of the Y0-axis is connected to the controller 6 through a corresponding first signal line 41, so that the controller 6 can be used to control the capacitance charge and discharge and the capacitance variation of Y0-axis will be detected. Since the charge-discharge course adopts the double-channel which means the both ends of each axial can be charged and discharged through the signal lines 41 and common signal line 42, the charge-discharge frequency is improved. This method also can be applied to improve the electrode along the X-axis according to different operating requirements.

Figure 15:
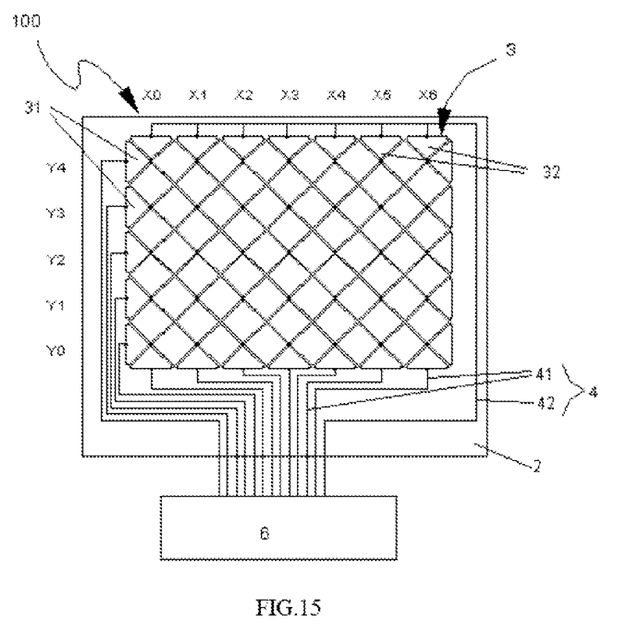
FIG. 15 is a sketch shows the work principle of the capacitive touch panel in accordance with the second embodiment of the invention.

With reference to the second embodiment, the following description illustrates the scanning method of the capacitive touch panel of the present invention. As shown in FIG. 15, the touch panel 100 comprises a matrix of conductive assemblies 31 and 32 along the X-axis and Y-axis directions. The second signal line 42 (common signal line) is always connected to a constant signal source in the controller 6 which provides common driving signals of with same frequency, same potential and phase as other signal lines successively scan the capacitance variation of each axial direction. Controller 6 scans X-axis and Y-axis one by one. When the controller 6 senses the X0-axis, Y-axis (Y0-Y4) will be switch to the ground while the lower ends of X1-axis to X6-axis will be switched to connect with the common signal line 42 to receive signals provided by the same signal source. The lower end of the X0-axis is connected to the controller 6 through a corresponding first signal line 41, so that the controller 6 can be used to control the capacitance charge and discharge and the capacitance variation of X0-axis will be detected. Since the charge-discharge course adopts the double-channel which means the both ends of each axial can be charged and discharged through the signal lines 41 and common signal line 42, the charge-discharge frequency is improved. This method also can be applied to improve the electrode along the Y-axis according to different operating requirements.

Figure 16:
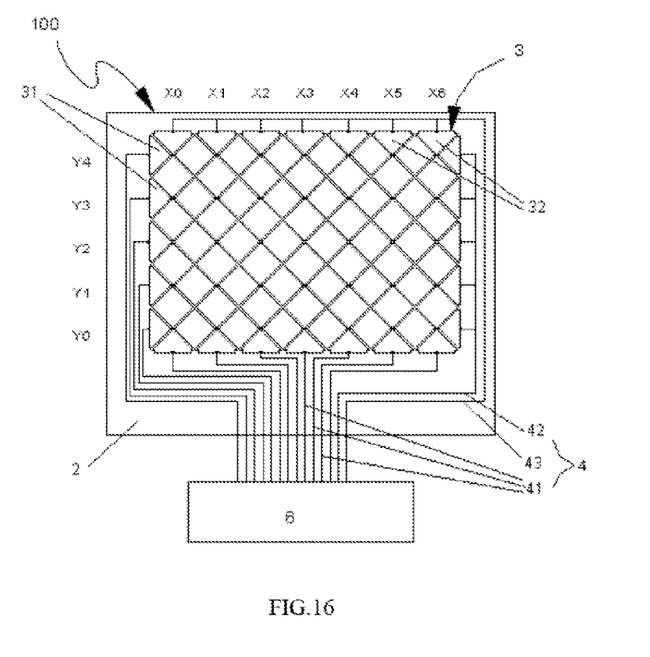
FIG. 16 is a sketch shows the work principle of the capacitive touch panel in accordance with the third embodiment of the invention.

With reference to the third embodiment, the following description illustrates the scanning method of the capacitive touch panel of the present invention. As shown in FIG. 16, the touch panel 100 comprises a matrix of conductive assemblies 31 and 32 along the X-axis and Y-axis directions. The second signal line 42 and the third signal line 43 (common signal lines) are always connected to a constant signal source in the controller 6 which provides common driving signals of with same frequency, same potential and phase as other signal lines successively scan the capacitance variation of each axial direction. Controller 6 scans X-axis and Y-axis one by one. When the controller 6 senses the Y0-axis, X-axis (X0-X6) will be switch to the ground while the left ends of Y1-axis to Y4-axis will be switched to connect with the common signal line 42 to receive signal provided by the same signal source. The left end of the Y0-axis is connected to the controller 6 through a corresponding first signal line 41, so that the controller 6 can be used to control the capacitance charge and discharge and the capacitance variation of Y0-axis will be detected. Since the charge-discharge course adopts the double-channel which means the both ends of each axial can be charged and discharged through the signal lines 41 and common signal line 42, the charge-discharge frequency is improved. When the controller 6 senses the X0-axis, Y-axis (Y0-Y4) will be switch to the ground while the lower ends of X1-axis to X6-axis will be switched to connect with the common signal line 43 to receive signal provided by the same signal source. The lower end of the X0-axis is connected to the controller 6 through a corresponding first signal line 41, so that the controller 6 can be used to control the capacitance charge and discharge and the capacitance variation of X0-axis will be detected. Since the charge-discharge course adopts the double-channel which means the both ends of each axial can be charged and discharged through the signal lines 41 and common signal line 43, the charge-discharge frequency is improved.

Figure 17:
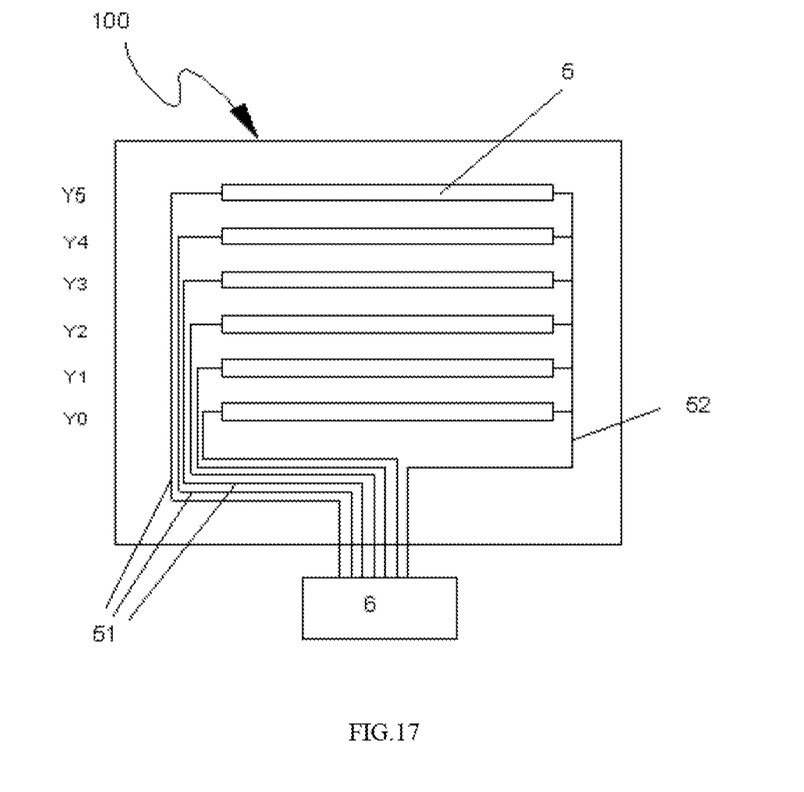
FIG. 17 is a sketch shows the work principle of the capacitive touch panel in accordance with the fourth embodiment of the invention.
Figure 18:
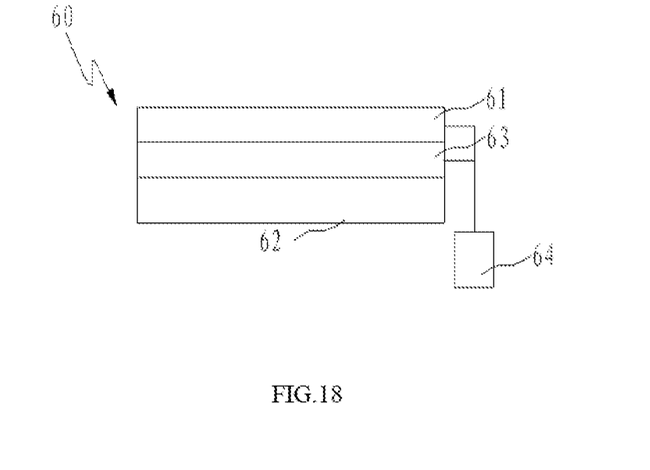
FIG. 18 is a schematic view of a electronic device having the capacitive touch panel in accordance with the invention.

With reference to the fourth embodiment, the following description illustrates the scanning method of the capacitive touch panel of the present invention. As shown in FIG. 17, the touch panel 100 comprises a plurality of conductive assemblies 5 along the Y-axis (Y0-Y5) directions. The second signal line 52 (common signal line) is always connected to a constant signal source in the controller 6 which provides signals of with same frequency, same potential and phase as other signal lines successively scan the capacitance variation of each axial direction. Controller 6 scans the assemblies one by one. When the controller 6 senses the Y0-axis, the left ends of Y1-axis to Y5-axis will be switched to connect with the common signal line 52 to receive signals provided by the same signal source. The left end of the Y0-axis is connected to the controller 6 through a corresponding first signal line 51, so that the controller 6 can be used to control the capacitance charge and discharge and the capacitance variation of Y0-axis will be detected. Since the charge-discharge course adopts the double-channel which means the both ends of each axial can be charged and discharged through the signal lines 51 and common signal line 52, the charge-discharge frequency is improved.

There is another scanning method in which the second signal line 42 or the third signal line 43 (the common signal lines) are also supported by a signal source that provides signals at a certain frequency. The non-scanning axis are connected to the ground while the scanned axis is connected to the controller 6, so that the controller 6 can be used control the charge and discharge of the capacitance and the capacitance variation of the axis will be detected. In this way, the capacitance variation of each axis will be scanned successively.

Since the capacitive touch panel provided in the present invention adopts a scanning method which enables charging and discharging at the same time, the two ends of the conductive assemblies are essentially equipotential, and therefore the current consumption is effectively reduced.

According to the above mentioned, with the advantageous scanning method, the capacitive touch panel structure of the present invention can effectively reduce the charge-discharge time as well as the current consumption, avoid the signal attenuation and increase the scanning speed. Moreover, the capacitive touch panel provided in the present invention is easy and convenient to be made.

The capacitive touch panel in accordance with present invention can be combined with a display, such as liquid display screen, to construct an electronic device. An electronic device 60 having the capacitive touch panel of the present invention is shown in FIG. 17. An electronic device 60 comprises a capacitive touch panel 61 for sensing a touch action thereon and generating corresponding touch sensing signals; a processor 64 for receiving and processing said touch sensing signals and generating corresponding display instruction signals; and a display 62 for receiving said display instruction signals and displaying corresponding images. An adhesive layer 63 disposed between the capacitive touch panel 61 and the display 62 used to combine the capacitive touch panel 61 with the display 62.

The above description is only the preferred embodiment of the present invention, and therefore it should not limit the scope of the invention. It is to be noted that the equivalent changes or modifications made according to the claims and the specification of the present invention should be included in the scope of the invention.

What is claimed is:

1. A scanning method comprising:
   providing a plurality of first conductive assemblies arranged in a first direction;
   sequentially scanning each of the first conductive assemblies through a corresponding first signal line connected to a first end of each first conductive assembly, meanwhile providing a constant signal source with a common driving signal through a second signal line to a plurality of second ends of all the first conductive assemblies, wherein the step of sequentially scanning each of the first conductive assemblies further comprises: sequentially providing a scanning signal to each of the first conductive assemblies through the corresponding first signal line, and wherein the scanning signal has a same frequency, a same potential and a same phase with the common driving signal;
   wherein when scanning one of the first conductive assemblies, the scanning signal is input to the first end of the scanned first conductive assembly to charge and then discharge repeatedly for detecting the capacitance variation thereof, and the second end of the scanned first conductive assembly is connected to the constant signal source through the second signal line while the first ends and the second ends of other non-scanned first conductive assemblies are connected to the constant signal source; and
   generating touch sensing signals while the capacitance variation of the scanned first conductive assembly is detected.

2. The scanning method of claim 1, further comprising a step of providing a controller configured to process the touch sensing signals of the first conductive assemblies.

3. The scanning method of claim 2, further comprising arranging the plurality of first conductive assemblies evenly in the first direction.

4. The scanning method of claim 1, wherein the first conductive assemblies, the first signal line and the second signal line are made of a transparent conductive material.

5. A scanning method comprising:
providing a controller with a plurality of first signal lines, a plurality of second signal lines and a first common signal line;
providing a plurality of first conductive assemblies arranged in a first direction and a plurality of second conductive assemblies arranged in a second direction, wherein a first end of each of the first conductive assemblies is connected to the corresponding first signal line, a second end of each of the first conductive assemblies is connected to the first common signal line, and each of the second conductive assemblies is connected to the corresponding second signal line;
providing a common driving signal to the second ends of the first conductive assemblies through the first common signal line;
scanning each of the first conductive assemblies sequentially through the first signal lines for detecting at least one capacitance variation on the first conductive assemblies, wherein the second conductive assemblies are grounded, wherein the step of sequentially scanning each of the first conductive assemblies further comprises: sequentially providing a scanning signal to each of the first conductive assemblies using the controller through the first signal lines, and wherein the scanning signal has the same frequency, the same potential and the same phase with the common driving signal;
scanning each of the second conductive assemblies sequentially through the second signal lines for detecting at least one capacitance variation on the second conductive assemblies, wherein the first conductive assemblies are grounded; and
generating touch sensing signals while the capacitance variation of the scanned first conductive assembly and the capacitance variation of the scanned second conductive assembly are detected.

6. The scanning method of claim 5, wherein the step of sequentially scanning each of the first conductive assemblies further comprises: inputting the scanning signal to the first end of the first conductive assembly subjected to scanning to repeatedly charge and discharge the first conductive assembly subjected to scanning, upon scanning one of the first conductive assembly, and
inputting the common driving signal to the second end of the scanning first conductive assembly to charge and discharge the scanning first conductive assembly.

7. The scanning method of claim 5, wherein the controller further has a second common signal line, and wherein a first end of each of the second conductive assemblies is connected to the corresponding second signal line, and wherein a second end of each of the second conductive assemblies is connected to the second common signal line.

8. The scanning method of claim 7, wherein the step of sequentially scanning each of the second conductive assemblies further comprises: inputting the common driving signal to the second ends of the second conductive assemblies through the second common signal line.

9. The scanning method of claim 8, wherein the step of sequentially scanning each of the second conductive assemblies further comprises: sequentially providing a scanning signal to each of the second conductive assemblies using the controller through the second signal lines, and wherein the scanning signal has the same frequency, the same potential and the same phase with the common driving signal.

10. The scanning method of claim 9, wherein the step of sequentially scanning each of the second conductive assemblies further comprises: inputting the scanning signal to the first end of the second conductive assembly subjected to scanning to charge and discharge the second conductive assembly subjected to scanning, upon scanning one of the second conductive assemblies, and
inputting the common driving signal to the second end of the scanning second conductive assembly to charge and discharge the scanning second conductive assembly.

11. The scanning method of claim 5, further comprising arranging the first conductive assemblies parallelly in the first direction, and arranging the second conductive assemblies parallelly in the second direction.

12. The scanning method of claim 5, further comprising arranging the first conductive assemblies and the second conductive assemblies as a matrix structure.

13. The scanning method of claim 5, wherein in the step of providing a plurality of first conductive assemblies and a plurality of second conductive assemblies, each of the first conductive assemblies comprises a plurality of first conductive cells and each of the second conductive assemblies comprises a plurality of second conductive cells, wherein the adjacent first conductive cells are connected by a first conductive line and the adjacent second conductive cells are connected by a second conductive line, wherein an insulator is disposed between the first conductive line and the corresponding second conductive line.

14. The scanning method of claim 13, wherein the first conductive cells and the second conductive cells are made of a transparent conductive material, and the insulator is made of a transparent insulating material.

15. A scanning method comprising:
providing a controller with a plurality of signal lines and a common signal line;
providing a plurality of first conductive assemblies arranged in a first direction, wherein a first end of each of the first conductive assemblies is connected to the corresponding signal line, and a second end of each of the first conductive assemblies connects to the common signal line;
providing a common driving signal to the second ends of the first conductive assemblies through the common signal line;
scanning each of the first conductive assemblies sequentially through the signal lines for detecting at least one capacitance variation on the first conductive assemblies, wherein the step of sequentially scanning each of the first conductive assemblies further comprises: sequentially providing a scanning signal to each of the first conductive assemblies through the signal lines using the controller, and wherein the scanning signal has the same frequency, the same potential and the same phase with the common driving signal; and
generating touch sensing signals while the capacitance variation of the scanned first conductive assembly is detected.

16. The scanning method of claim 15, wherein the step of sequentially scanning each of the first conductive assemblies further comprises:
inputting the scanning signal to the first end of the first conductive assembly subjected to scanning to charge and discharge the first conductive assembly subjected to scanning upon scanning one of the first conductive assemblies, and inputting the common driving signal to the second end of the scanning first conductive assembly subjected to scanning to charge and discharge the first conductive assembly subjected to scanning.

17. The scanning method of claim 15, further comprising arranging the plurality of first conductive assemblies evenly in the first direction.

18. The scanning method of claim 15, wherein the first conductive assemblies, the first signal line and the second signal line are made of a transparent conductive material.

* * * * *